United States Patent

Acker et al.

Patent Number: 6,014,437
Date of Patent: *Jan. 11, 2000

[54] MULTI SERVICE PLATFORM ARCHITECTURE FOR TELEPHONE NETWORKS

[75] Inventors: Deborah Lynn Acker, Deerfield Beach; Thomas Edward Creamer, Boca Raton, both of Fla.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/792,018

[22] Filed: Feb. 3, 1997

[51] Int. Cl.$^7$ .............................. H04M 3/42; H04M 7/00; H04L 12/66

[52] U.S. Cl. .......................... 379/219; 379/220; 379/229; 379/207; 379/900; 370/352

[58] Field of Search ..................................... 379/219, 220, 379/225, 229, 201, 207, 112, 900, 901, 230, 231; 370/352

[56] References Cited

U.S. PATENT DOCUMENTS

| | | | |
|---|---|---|---|
| 5,208,848 | 5/1993 | Pula | 379/67 |
| 5,469,500 | 11/1995 | Satter et al. | 379/201 |
| 5,519,772 | 5/1996 | Akman et al. | 379/265 |
| 5,533,115 | 7/1996 | Hollenbach et al. | 379/220 |
| 5,537,466 | 7/1996 | Taylor et al. | 379/201 |
| 5,572,581 | 11/1996 | Sattar et al. | 379/201 |
| 5,572,583 | 11/1996 | Wheeler, Jr. et al. | 379/207 |
| 5,583,920 | 12/1996 | Wheeler, Jr. | 379/88 |
| 5,644,631 | 7/1997 | Sattar et al. | 379/201 |
| 5,696,809 | 12/1997 | Voit | 379/27 |
| 5,703,940 | 12/1997 | Sattar et al. | 379/207 |
| 5,712,903 | 1/1998 | Bartholomew et al. | 379/207 |
| 5,729,598 | 3/1998 | Kay | 379/207 |
| 5,742,668 | 4/1998 | Pepe et al. | 379/88.22 |
| 5,742,905 | 4/1998 | Pepe et al. | 379/210 |
| 5,761,290 | 6/1998 | Farris et al. | 379/207 |

*Primary Examiner*—Krista Zele
*Assistant Examiner*—Benny Q. Tieu
*Attorney, Agent, or Firm*—Richard A. Tomlin; Robert Lieber

[57] ABSTRACT

A multiprocessor subsystem, for a portion of the public switched telephone network (PSTN) conforming to architectural standards for advanced intelligent networks (AIN), contains processor elements for participating in management of call routing/switching processes, and other processor elements for participating in management of services provided to PSTN users and subscribers. The processors participating in call routing processes are tightly concentrated to ensure reliable control of respective processes, while the processors participating in management of user services are distributed so as to allow for virtually unlimited growth in new type services without potentially disrupting existing call traffic. This subsystem also contains processor elements having interfaces to networks external to the PSTN; e.g. data networks such as the Internet and World Wide Web, and pager networks. These interfaces allow for users to control enablement and disablement of services to which they subscribe in a manner independent of their telephone line usage (e.g. to enable or disable services such as call waiting, either before or during a call, and/or to define the duration of the respective enablement or disablement as extending to an arbitrary number of calls that the user can define).

7 Claims, 3 Drawing Sheets

MSP/6000 - Principal Components

MSP/6000 - Principal Components

MULTI SERVICE PLATFORM ARCHITECTURE FOR TELEPHONE NETWORKS

BACKGROUND OF THE INVENTION

Digital control of telephony has led to advancement of intelligent network standards for the public switched telephone network (hereafter the "PSTN"). As viewed herein, the PSTN is the aggregate world-wide of all instrumentalities operating to interconnect telephones used by members of the public at large (both land-based and cellular/radio type telephones), but excluding privately deployed facilities which serve specific users or corporate employees (e.g. private networks formed by PBX's, Centrexes, etc.) as well as public data networks such as the Internet, World-Wide Web, etc.

A problem with the present call management infrastructure of the PSTN is that its controls of user services (particularly services relating to voice announcements and speech recognition) tend to be tightly concentrated on a centralized basis; stemming from the need to ensure that switched call traffic is not potentially disrupted by commands originating from different places. However, this makes it awkward, impractical or sometimes impossible to introduce new user services without affecting the handling of call traffic during the introduction. Furthermore, administration of such services also tends to be tightly concentrated, so that PSTN users requiring changes in their services have very limited options; for instance, a user having "call waiting" service can only disable that service during individual calls, and only by pre-dialing a special set of symbols (e.g. "*70") as a subset of the called number.

The present invention seeks to provide improvements to the call management and administrative infrastructure of the PSTN, which is both adaptive to introduction of new services, without potential disruption of existing call traffic, and also broadens user options for enabling and disabling services to which they subscribe so that such services can be enabled or disabled virtually at any time (before and during individual calls) and their status (of enablement or disablement) can be maintained virtually for any length of time, or any number of calls, that a user desires to specify. This improved user interface further tends to allow for the introduction of new services which would have been impractical to offer or maintain in the prior infrastructure.

SUMMARY OF THE INVENTION

The present invention is a multiprocessor type "intelligent peripheral" system for use in PSTN call management networks conforming to existing architectural specifications for intelligent telephony networks, particularly to architectures for advanced intelligent network (AIN) systems.

Existing telephony control networks conforming to AIN architecture contain "intelligent peripheral" subsystems which control switched call traffic and user services (call waiting, call forwarding, voice announcements, speech recognition functions, etc.) within assigned regions of their use. The present invention is a multiprocessor system intended for use as an intelligent peripheral system of this kind. However, the present system differs from comparable previously known systems in that it contains what is considered to be a unique combination of centralized and distributed processor elements; specifically, a combination wherein management of call routing/switching is tightly concentrated or centralized in one or more call processing elements, while functions pertaining to management of user services are distributed within a sub-network of service processing elements that is capable of being enlarged without affecting call switching and/or call traffic.

A preferred embodiment of the present system, designated as "The IBM Multiservice Platform for AIX Implementation" (hereafter termed MSP/6000), uses IBM RISC System/6000[1] processors (hereafter termed RS/6000 processors) as basic computer elements. One aspect of this system is that it provides decentralized control of services that can be varied by PSTN subscribers/users (e.g. voice announcements and user speech recognition applications), while maintaining centralized control over call switching processes. This allows for virtually unlimited growth in creation and implementation of new user services without impacting or otherwise affecting call routing processes.

[1]AIX, IBM, and RISC System/6000 are trademarks of the International Business Machines Corporation Another aspect of the present system is that some of its processor elements/modules are structured to provide interfaces to communication networks external to the PSTN— e.g. client/server interfaces to external data networks such as the Internet and World Wide Web (hereafter, also termed the web)—such that PSTN call handling services can be controlled through these external networks (enabled, disabled, etc.) by either PSTN customers or their authorized representatives.

Another aspect of the invention is that the just-mentioned interfaces to external communication networks can be manifested either within a call processing element or within a dedicated Element Management System (EMS) that is separate from processing elements handling call processing and user services.

Another aspect of the invention is that the processor elements therein are interconnected, through a shared communication network such as an ethernet link, enabling such elements to intercommunicate as peers regardless of their geographic separations.

These and other aspects, features, benefits and advantages of this invention will be more fully understood and appreciated by considering the following description and claims.

DETAILED DESCRIPTION

1. Advanced Intelligent Network (AIN)—Architectural Overview

Figure 1:
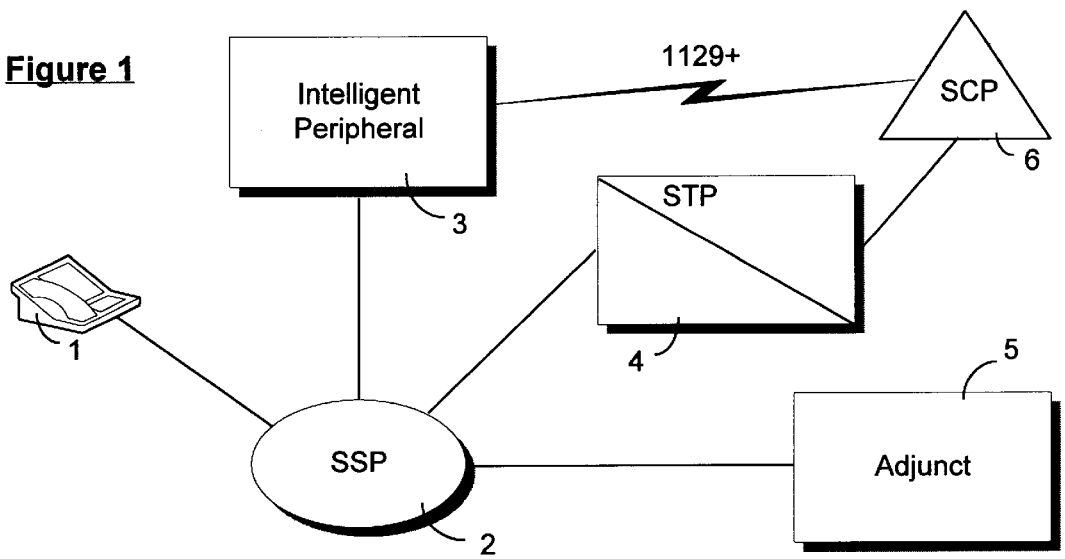
FIG. 1 is a block diagram of a telephone network conforming to AIN architecture.

A network conforming to PSTN architectures for advanced intelligent network (AIN) design, and representing an environment in which the present invention can be used to advantage, is shown in FIG. 1. The currently evolving architecture of such networks is service independent, meaning that its service application logic is separated from the network infrastructure. Previously, service application logic was embedded within the network infrastructure and tended to be service specific. For example, conversion data bases and logic associated with 800 number service originally was embedded within the telephony switch software. Since many thousands of switches were controlled by that software, maintenance and updating of the 800 service became unmanageable so that support of that service in the PSTN became close to impossible to sustain.

Although the description to follow of FIG. 1 is deemed sufficient to fully explain the type of environment in which the present invention can be used, further information about AIN architecture can be obtained by referring to one or more of the following published documents (whose teachings are incorporated herein by reference, to the extent if any that respective teachings could have relevance hereto):

Bellcore, GR-2802-CORE, Advanced Intelligent Network (AIN) 0.X Issue 1, Generic Requirements, Issue 2, December 1993

Bellcore, GR-1129-CORE, Advanced Intelligent Network (AIN) 0.2 Switch—Intelligent Peripheral Interface (IPI) Generic Requirements, ILR 1E, November, 1994

Bellcore, SR-3511, BD-ISCP5.0-NF1129-IR001, ISCP-IP Interface Specification, Issue 1-D, Jun. 27, 1996, Version 5.0

FIG. 1 shows an AIN network associated with a regional node of the PSTN. Telephone 1, available to a "local" PSTN user, links to the regional node through a signal switching point (SSP) complex 2. SSP 2 connects to an intelligent peripheral (IP) system 3, a hierarchical network of signalling transfer points (STPs) 4, and an adjunct system 5.

IP 3 provides switched connections for telephone calls passing through the respective regional node (e.g. between local and trunk lines traversing the node), and controls service applications associated with respective calls (conferencing, voice announcements, speech recognition applications, call forwarding, etc.). SSP 2 supports communications between telephones such as 1 and IP 3 using ISDN (Integrated Services Digital Network) connections.

SSP 2 communicates through the STPs with a service control point (SCP) 6, using a known signalling system 7 (SS7) packet-switched message format. The IP 3 and SCP 6 coordinate service logic functions (e.g. functions required to play voice announcements) using a known "1129+" signalling protocol.

Call connections between local telephones such as 1 and other local telephones are formed by operations of IP 3 and SSP2. Connections between local telephone 1 and remote telephones associated with remote SSPs and IPs are formed by transmission of call setup messages between SSP 2 and the remote SSPs via STP 4 (and other STPs if appropriate) as well as SCP 6 (and remote SCPs if appropriate). Upon determining that a path exists for a required remote call connection, SSP 2 and the other SSPs cooperate with respective IPs to establish the connection.

Message communications, between SSPs such as 2 and both respective IPs such as 3 and associated SCPs such as 6, are required to set up call connections and administer telephone user services associated with respective calls. Such message communications are conducted through a common channel signalling (CCS) network formed between the SSPs, the STPs, and the SCPs using the aforementioned SS7 packet switched signalling protocol. The SS7 protocol is used as a network transport layer to facilitate message communication within the CCS network. A regional CCS network, encompassing a region containing the local switching office nearest to the telephone 1 and other switching offices, contains a hierarchy of STPs associated with a hierarchy of SCPs. Each SSP, at local levels nearest to individual user telephones such as 1, connects to two SSPs associated with the respective level. This redundancy is useful to produce high reliability.

Message communications between IPs such as 3 and SCPs such as 6 are conducted in the previously mentioned "1129+" signalling protocol. That protocol enables service logic running on the SCPs to coordinate actions with service logic running on the IPs during delivery of telephone services to telephones such as 1.

Operations of elements 2–6 enable an authorized user of telephone 1 (e.g. the owner of the telephone or an authorized representative of the owner) to administer services to which the owner of the telephone has subscribed (both conventional services, such as call waiting and call forwarding, and new services yet to be defined) without required assistance of operators or other human representatives of the telephone company (Telco) that interfaces to the telephone.

SSPs are program-controlled telephone switching systems (either access tandem switches or end offices) within local networks connecting to user telephones in a local sub-region. They form local interfaces to the aforementioned CCS network.

SCPs are stand-alone network systems which, in existing intelligent telephony control networks, have been primary focal points for administration of services provided to PSTN users. An SCP can contain service logic and online, real-time database systems. An SCP provides call processing information and instructions in response to queries received through the CCS network.

SCPs support multiple applications, each containing logic defining the handling of individual calls. After determining actions to be performed in response to a specific query, the SCP sends instructions for handling the respective call back to the SSP that initiated the inquiry. Different services/applications may be offered at different SCPs.

Adjuncts 5 are also stand-alone network systems. They are functionally equivalent to SCPs, but each communicates directly with only one locally associated SSP (whereas SCPs can communicate with multiple SSPs both within and external to a local region or sub-region). In operation, such adjunct networks enable the development and delivery of telephony services which are not totally reliant on SSPs and SCPs for implementation.

2. MSP/6000 Architecture Overview—Hardware

The present invention is useful as an intelligent peripheral (IP) such as 3 in an intelligent telephone network like that shown in FIG. 1. A preferred embodiment of this type of IP system is designated presently as an MSP/6000 system. A typical hardware architecture configuration for an MSP/6000 system is shown at 3$a$ in FIG. 2.

Each MSP/6000 system contains resources needed to exchange information with PSTN end users—such as information needed to provide customized announcements to users, collect DTMF (dual tone multi frequency) digits keyed by users, etc—as well as resources required to communicate with other elements of an intelligent network such as that in FIG. 1 (SSPs, SCPs, etc.). Each system also contains logic for implementation of user services, and is uniquely configured to allow for introduction of new services without disruption of existing telephone call traffic. Logic and other resources required to implement existing and new services can be shared between the MSP/6000 and e.g. the SCP 6 (FIG. 1). Basic service capabilities of an MSP/6000 include:

offloading service logic from an SCP collecting sets of digits to pass to an application transmitting sets of digits creating a call connection leg by dialing out on a line or trunk a freeing call connection legs after termination of a call transmitting DTMF tones on existing legs separating one or more existing connection legs of a conference call (split)

sending a hookflash signal answer an incoming call (either automatically or by application control, e.g. voice mail application)

recording, playing and deleting digitized announcements performing speech recognition functions in response to user speech performing actions for enabling and disabling other user services such as call waiting, call forwarding, caller ID, etc.

provide application support for numerous applications; including outdialing, conferencing, etc.

Figure 2:
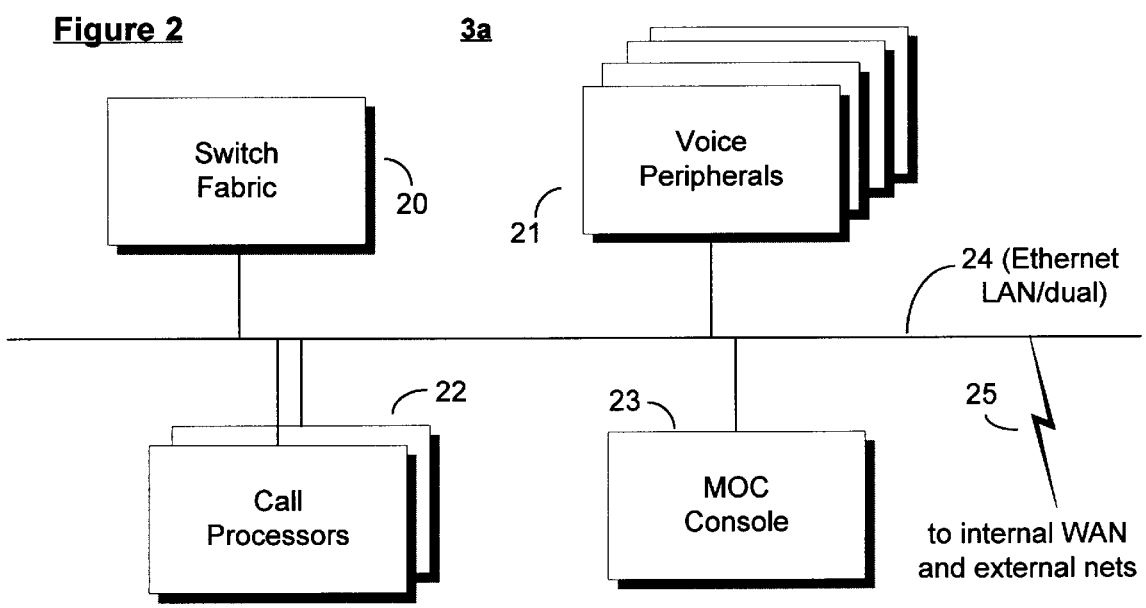
FIG. 2 is a block diagram of the hardware architecture of an intelligent peripheral (IP) system, for the network of FIG. 1, constructed in accordance with the present invention.

Referring to FIG. 2, standard elements of an MSP/6000 system include a "switch fabric" complex 20, voice peripheral processors 21, call processor 22, a maintenance and operations (MOC) console processor 23, and a communication link 24.

Critical components of this configuration—the switch complex 20, call processor 22, and communications link 24—are configured redundantly to withstand failure of any component, and thereby ensure high availability of the system to telephone call traffic at all times. Communications link 24 preferably is a dual configuration of Ethernet LANs (local area networks). Switch complex 20 is a redundant (A and B zoned) configuration of switch apparatus and integral switching control logic, preferably a VCO-80 system of the type provided by Summa Four corporation.

Call processor 22 comprises a dual configuration of processors; preferably, IBM RISC System/6000 model R24 type processors. Each of the voice peripherals 21, as well as the MOC console, is also constructed around a powerful RISC System/6000 model R24 type processor. The voice peripheral processors (also referred to hereafter as VPs) are so configured that individual VPs can be added to or subtracted from an existing IP configuration without affecting critical call processing/switching operations; e.g. so that new user services can be introduced on that basis.

In addition to directing voice related user services (announcements, speech recognition functions, etc) the voice peripherals can be used for user services that are not voice based (call waiting, call forwarding, caller ID, etc). The latter services are supported by DTMF tone signalling between the voice peripherals and not-shown centrex type switches associated with either the respective MSP/6000 regional node or sub-regions between the regional node and groups of user telephones.

Switch fabric 20 connects the MSP/6000 to not-shown signal lines of the PSTN (e.g. to local and trunk lines of the respective node). Its redundant switching zones are connected to respective redundant rails of the Ethernet link 24. Each switch zone has an internal disk that contains the databases needed for operation of the respective zone. CPU logic in the complex synchronizes and coordinates switch operations. Switch fabric 20 also contains network interface cards supporting connections of the complex (via the Ethernet LANs) to analog, ISDN and T1 networks, and a card supporting call progress analysis functions. Together with the SSP, switch 20 provides connections between PSTN trunks (e.g. T1 lines) and local signal lines extending to local telephones such as 1 (FIG. 1). Optionally, switch 20 may also include cards supporting digital conferencing DTMF reception/collection, and other telephony related functions.

Each of the voice peripherals 21 is constructed around a RISC System/6000 processor and the IBM DirectTaLk/6000 voice product[2]. The latter product provides speech-related capabilities—such as voice recording, voice playback, digit collection, and speech recognition—across multiple service applications on the respective MSP/6000 system. An MSP/6000 system may contain multiple VPs depending on the number of voice peripheral ports needed by the system. In addition to speech-related functions, one or more VPs may be used to support other user services such as call waiting, call forwarding, etc. The VPs have direct T1 connections to the switch fabric of the respective MSP/6000 system. In applications where high reliability is required, one or more additional VPs than are necessary can be provided as back-up to any failed VP (e.g. N+1 VPs can be used to support N+1 different sets of service applications, while allowing for use of one of them to back up the other N). All digitized announcements used by these units are stored on disks attached to the call processors and accessed via LAN 24; such disks being redundantly "mirrored" to avoid service outages due to loss of a disk. Each VP supports up to five T1 connections with up to 120 voice circuits; and includes service creation and support capabilities for: voice message recording and playback; generation, detection and collection of DTMF tones; "play data" capabilities relating to monetary values, dates, times, and enumeration. Service application logic and associated prompts are stored locally on the VPs after being distributed to respective VPs.

[2]IBM and DirectTalk/6000 are trademarks of International Business Machines Corporation The call processors (CPs)—consisting of a pair of RISC System/6000 computers based on the IBM RISC System/6000 workstation—execute layered software (see discussion of software architecture in next section below) that includes the logic determining how calls are treated and processed. Both CPs are connected to and share the same physical disks for data storage, and data stored on the disks is available to both. The CPs are configured in a high availability arrangement wherein both are active and processing calls, but which can fall back to continued operation with a single CP when necessary. The CPs use "mirrored" disks to ensure reliability and provide quick access to data. Each processor has a CD-ROM drive and tape drive for loading its respective operating system software and other software and for backing up and restoring information accessed principally through the mirrored disks.

MOC 23, which is the primary user interface to the MSP/6000, is based on the RISC System/6000 workstation with multitasking capabilities. It displays alarm and status information about itself and the other hardware elements 20–22, software processes conducted in the respective MSP/6000 system, and communication links used by the system. It also permits an end user to administer and control applications running on the system. It also oversees installation and loading of operating system and some layered software products, as well as back up and restoration of its own disks and the disks used by the call processors.

LAN 24 (FIG. 2) provides not-shown connections between the respective MSP/6000 node and other AIN elements (refer to FIG. 1), and may have connections to external networks (e.g. the Internet, World Wide Web, pager networks, etc.) as suggested at 25. Not-shown communications equipment associated with link 24 includes: two terminal servers connecting the Ethernet LAN to the component processors and switch fabric of the respective system; a terminal providing direct console access to any system processor; and one or more Ethernet Hubs connecting the respective system with other AIN elements and remote MSP/6000 systems.

Optional components of an MSP/6000 system include: shared servers, an MSP/6000 element management system (EMS) processor, and an MSP/6000 service creation environment (SCE) processor. Where the latter two processors are not explicitly provided some of their functions are performed by the standard call processors. The shared servers, which are used to support service applications executing on the voice peripherals, are each based on the RISC 6000 workstation. The EMS system, if separate from the call processors, also is based on the RISC 6000 workstation, and supports functions such as distribution of announcements, service logic and prompts to individual voice processors. The SCE system also is based on the RISC 6000 workstation, and supports creation of service application logic and associated prompts, as well as providing microphones for recording of announcements on tape and audio equipment for playback of recorded tape announcements.

As described thus far, the MSP/6000 system has two aspects that are considered particularly unique. One is that the switch fabric and call processors appear to each other and the rest of the system as singular unified or centralized elements, whereas the voice peripherals appear to the rest of the system as distinctly separate or distributed elements. Thus, all processes pertaining to control of switched traffic are tightly concentrated within the call processors and switch fabric, while processes pertaining to user services are distributed among the voice peripherals. Thus, new user service applications can be easily added to an existing MSP/6000 node, and existing applications at the same node can be easily modified, without potentially disrupting or degrading the immediate handling of telephone call traffic at that node. The other particularly unique aspect is that the external link 25, together with LAN 24 and associated servers within the respective MSP/6000 system, enable users to control the system through communication media external to both their telephones and the PSTN itself (refer to discussion of FIG. 5 below for further details on this aspect).

3. MSP/6000 Architecture Overview—Software

Figure 3:
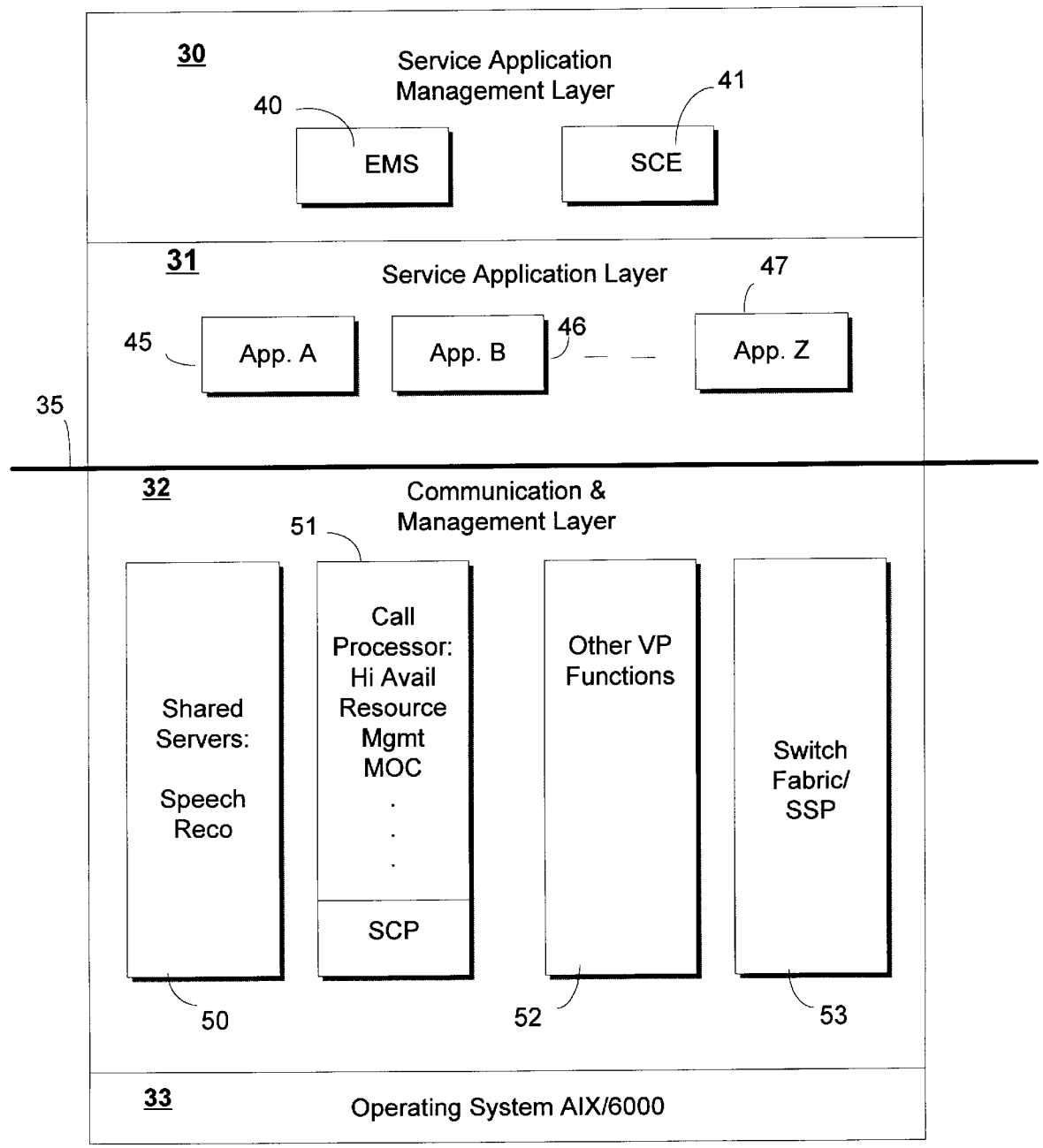
FIG. 3 is a block diagram of a preferred software architecture environment for the IP system shown in FIG. 2.

FIG. 3 provides an overview of the software architecture presently contemplated for the MSP/6000 system. The software is architected to operate in three layers—a service application management layer 30, a service application layer 31, and a communications and management layer 32—based on a platform 33 whose major component is the AIX/6000 Operating System commonly used in RISC/6000 processors. An application programming interface associated with service creation (Service Creation API) 35 links layers 31 and 32.

The Application Management layer 30—which is intended to be shared by multiple MSP/6000 nodes, and may be located physically and geographically separate from any and all of the nodes—consists of an element management system (EMS) 40 and a service creation environment (SCE) 41. SCE 41 provides both a graphical user interface (GUI) and a text-based application oriented language (AOL) suited for the development, debugging and testing of telephony service application logic (e.g. a language based on the DirectTalk/6000 state table service language). Using such language, developers can create applications that play back selected pre-recorded announcements serving as prompts to a user; such prompts being either prerecorded and edited from a tape cassette unit or recorded live using a microphone. EMS 40 includes tools for distributing, backing up and restoring service applications (including recorded prompts). The recorded prompts are distributed/restored to call processors in (multiple) MSP/6000 systems and transferred by the latter processors to voice peripherals in respective systems. Tools for backing up and restoring the prompts are distributed to MOC processors in respective systems and accessed therefrom when needed.

EMS 40 is the central point of administration for all MSP/6000 nodes served by it. The EMS collects and manages data from the nodes (both engineering and node usage data), translates provisioning requests—which are requests for additions, deletions and changes of subscriber-related data sent from a service management system (SMS)—and provisions the nodes with functions corresponding to the requests. It administers the databases of AIN networks containing the nodes, houses records of routing instructions and other control actions for customers, and provides an interface for adding, changing and deleting customer records. It also performs general administrative functions, such as number administration, network management, and data collection for network engineering (to enable a network to be upgraded adapt to changing call traffic conditions, etc.). It also serves as an AIN service software distribution center allowing for centralized management and control of loading of service software.

Service application layer 31 contains the software defining specific applications 45–47 (applications A, B, . . . , Z) available to PSTN customers. These are distributed to intelligent peripherals like the MSP/6000 according to application requirements at PSTN nodes served by respective intelligent peripherals.

Service applications comprise application logic, play application (for those requiring playing of recorded prompts and other messages), and intelligent peripheral functions associated with the applications. Service application logic and associated voice prompts are created and tested at SCE 41, and then distributed to MSP/6000 system nodes where respective application logic and prompts reside on voice peripheral processors (VPs) and are available to all ports on respective VPs. When a call processor at a node receives a message from an SCP indicating that a recorded prompt needs to be played, the message contains an action identifier. That number is used by the call processor to determine the VP responsible for the requested action, and the message is forwarded to that VP for handling. The VP then uses its resident play application logic to perform the action.

Service Creation API 35 defines (service application) calls supported by the MSP/6000 system nodes. These calls enable the service application logic to use communications and management resources 50–53, in the underlying layer 32, to implement requested actions. The communications and management resources support all communications and management functions needed at the nodes (e.g. communications functions needed to communicate with SCPs in "1129+" format—refer to earlier description of FIG. 1—and management functions needed to track user or other responses to a requested action). Functions 50 are used to provide speech recognition and other shared server applications. Functions 51–53 are used for call management and include: node messaging, resource management, control of local MOC processes, and control of switch fabric operations. As noted earlier, at any MSP/6000 node, these functions are distributed over and handled by plural VPs so that in general each VP handles functions different from those handled by the other VPs, which allows for introduction of new service functions to be implemented efficiently without disrupting existing call processing and switch traffic and also without disrupting operations of VPs not receiving the new functions.

The foregoing resources are used for passing service messages between the VPs and call processors. Processes executed by VPs receive messages from call processors, direct the messages to appropriate VP ports for execution, and return appropriate responses to call processors. Such VP processes include: general VP processes, VP platform communication processes, and additional VP processes.

General VP processes include: control management and log functions, reporting functions, and tracing functions. VP platform communication processes include: service message interfacing, port management, system API custom server functions, and custom server "child processes" (processes spawned by custom server functions). Together, these VP platform communication processes provide the service application logic with a capability for communicating with other MSP/6000 platform components, such as the call processors, that is "transparent" to other functions of the service application logic. Additional VP processes include: announcements, interactive voice response functions, and service applications.

Control management and log functions oversee startup and monitoring of VP processes identified in a configuration file. Reporting functions provide a mechanism for VP processes to report conditions arising during their execution; e.g. error conditions. Trace functions are used by VP processes to assemble and log trace data pertaining to execution paths and logic switches. Such data can be examined separate from a process causing its creation. Announcements are stored and maintained on the call processor as digitized files. They are distributed from the call processors to VPs for execution, thereby ensuring that the VPs utilize a common announcement pool. They are created either at the request of an application or through the SCE 41 associated with the region(s). Announcements are retrieved by each VP, from the associated call processor (via the respective LAN connection between processors), as needed. To each VP, it appears that the announcements used by it are locally stored. But since the announcements are actually stored on the call processors, control of their creation, administration and usage by VPs is simplified.

Interactive voice response functions provide basic service functions that can be requested from SCPs (reference item 6 FIG. 1). Some of these functions are: play announcement, collection of DTMF digits, and recording of messages from a subscriber. Service applications reside on VPs and work together with SCP service logic processes. During execution of service logic processes on the SCP, messages are sent to the MSP/6000 defining associated service application logic functions to be executed by designated VPs. When the service application is completed, appropriate information is furnished to the SCP in a return message enabling the SCP to continue execution of the respective logic and make subsequent decisions; e.g. to send messages requesting additional play application functions. Shared servers available (optionally) to service application logic are shared by all service applications requiring support of the servers. DirectTalk/6000 (mentioned previously) provides an open interface to speech recognition servers via a distributed voice technology (DVT) interface available as part of the service creation API 35.

4. Deployment of MSP/6000 Relative to PSTN Equipment Serving Multiple Nodes

Figure 4:
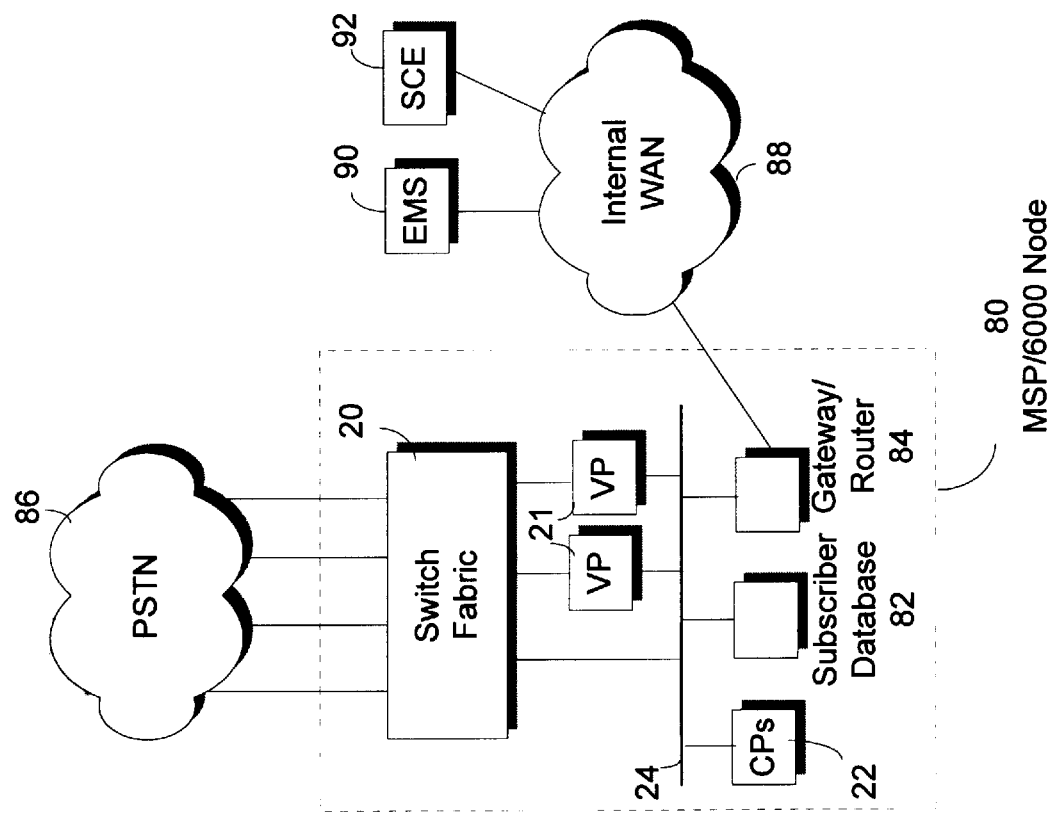
FIG. 4 is a block diagram showing how the IP system of FIG. 2 can be deployed to communicate with centralized service creation and data collection equipment spanning multiple IP nodes of the PSTN.

FIG. 4 illustrates a typical deployment of an MSP/6000 system, at a regional node 80 of the PSTN, relative to remote facilities serving multiple regional nodes of the PSTN; such facilities comprising a processor (or processors) providing an element management system (EMS) 90 and service creation environment system (SCE) 92 as described earlier. In this figure, elements shown in FIG. 2 are indicated by the numbers used to indicate them in that figure. Thus, the switch fabric is indicated at 20, voice processors VP are shown at 21, call processors are shown at 22, and the ethernet LAN link is shown at 24.

The subscriber database for node 80 is indicated generally at 82, and a processor serving as a gateway and router is shown at 84. Elements 20–22 connect to database 82 and processor 84 via LAN 24.

Switch fabric 20 connects to other parts of the PSTN shown at 86, via (or in association with) a not-shown SSP (reference element 2, FIG. 1). Processor 84 links, through wide area network (WAN) 88 within the PSTN, to remote facilities containing EMS 90 and SCE 92.

WAN 88 connects to other regional MSP/6000 systems not shown in this figure. Thus, remote facilities containing EMS 90 and SCE 92 can effectively communicate through the WAN with multiple nodes such as 80, and the functions associated with EMS and SCE can be applied to all such nodes via the WAN.

5. Deployment of MSP/6000 Node Relative To Networks External to the PSTN

Figure 5:
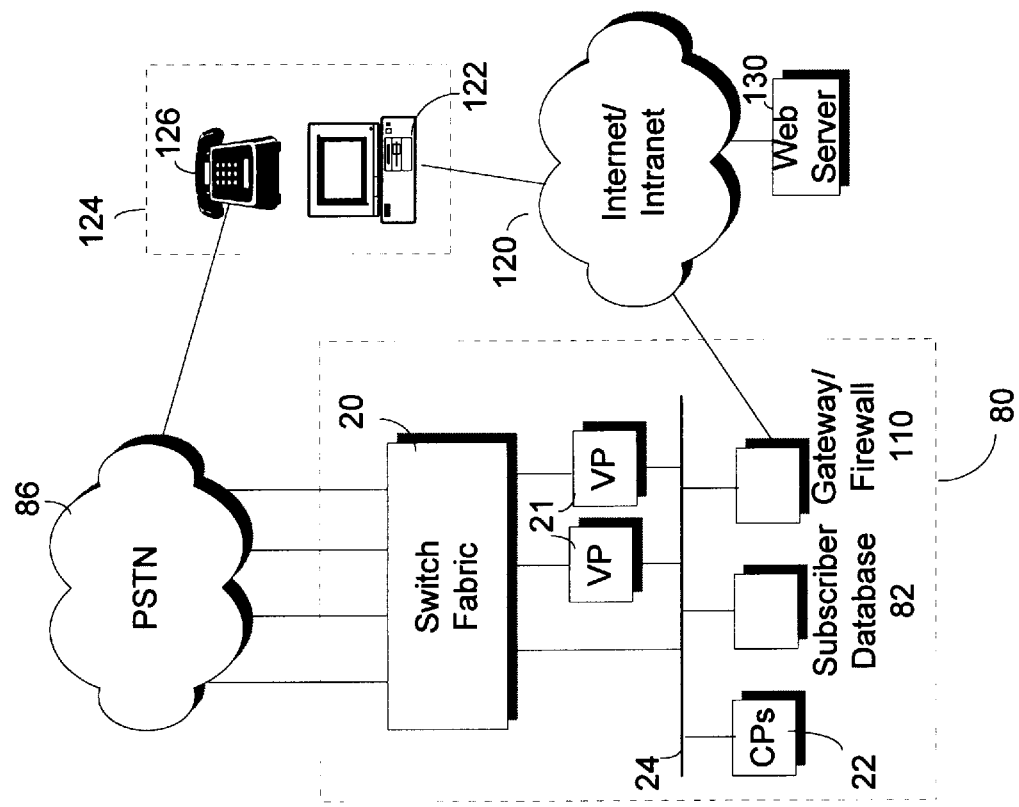
FIG. 5 is a block diagram showing how the IP system of FIG. 2 can be deployed relative to data networks external to the PSTN.

FIG. 5 illustrates a typical deployment of an MSP/6000 system, at a regional node 80 in the PSTN, relative to an external data network 120 (exemplified by the Internet). As in FIG. 4, elements of this figure that appear in FIG. 2 are indicated by the respective numbers used in the latter figure. Also, as in FIG. 4, parts of the PSTN that communicate with switch fabric 20, including transmission circuits connecting to customer premises within region 80, are represented by the symbolic "cloud" 86.

In this figure, a gateway/firewall processor 110 communicates via external data network 120 with computers such as 122 at customer premises such as 124, each of the latter containing respective telephones such as 126. Telephones such as 126, at customer premises connect to other customer telephones throughout the PSTN via regional connection links 86 and switch fabric 20. Gateway/firewall processor 110 may be either a separate processor or a server subprocess within a call processor 22.

Links formed via external data network 120, between customer computers and firewall processor 110, enable a customer or their authorized representative to control services executed by VPs 21 in association with database intelligence 82; and to effect such control in a "call-independent" manner (i.e. regardless of the idle or active state of connection of the respective customer telephone such as 126). Thus, this path can be used for instance to disable call waiting service for an indefinite number of calls subsequent to a request sent over this path, or to institute a new route (sequence of alternate numbers to try) for "call forwarding" services, etc.

In addition to enabling client applications running on customer computers to be used for modifying telephone services within the respective PSTN region 80, the external network 120 can enable processors within the respective PSTN node to link to web servers such as 130, and via the latter to facilities of the Internet that are available to customers of the latter network. This can be used, for instance, to allow PSTN customers (or their authorized representatives) to gain access to their own subscriber data, and thereby create and/or manage changes which need not directly involve (human representatives of) the service provider.

Those skilled in the art should immediately recognize many other service manipulation possibilities for this type of external network linkage, and they also should recognize that other types of external networks could be used to similar effect (for instance, links could also be provided to two-way pager networks, and via the latter to pager instruments carried by PSTN customers/users, etc.).

Considered globally, intelligent peripheral systems of the type described herein can provide the PSTN with the ability to quickly develop and deploy service applications across large geographic areas spanning plural regional nodes served individually by plural intelligent peripheral systems. The ability of central management software to distribute and load service applications to individual VPs within a regional node ensures that newly developed applications need not overburden any single VP, and also that VPs can be added to a node, as and when needed, without interrupting current operations in the node. Centralization of the call switching management functions within redundant call processors at a node ensures that the vital functions of the respective intelligent peripheral system can not be disrupted by events occurring either inside or outside of the respective system. The present internal LAN and client/server interface to external networks allow for flexible access to customer data both internally, through only PSTN routes, and externally through broad and growing networks like the Internet.

We claim:

1. An intelligent peripheral (IP) system for an intelligent telephony control system within the PSTN (public switched telephone network), said IP system containing multiple processing units for handling telephone calls between directly conversing users of said PSTN, said IP system comprising:

a first set of call processor units for controlling routing of said telephone calls through a portion of said PSTN occupying a predetermined geographic region served by the respective IP system; said first set comprising at least one call processor unit, and being expandable modularly to contain additional call processor units;

a second set of service application processor units for controlling various services provided to users of said PSTN having telephones within said predetermined region; said second set comprising at least one service application processor unit and being expandable modularly to contain additional service application processor units without affecting operational capabilities of any of the call processor units in said first set;

first linking means linking said call processor units in said first set and said service application processor units in said second set, for enabling said processor units linked by said first linking means to communicate with each other and with other elements of said IP system; and second linking means linking said first linking means to a communication network external to said PSTN, for enabling said call processor units in said first set to route telephone calls through said external communication network and for also enabling said service application processor units in said second set to extend said various services through said external communication network; said external communication network being configured to transport data unrelated to any voice transmission processes being executed in said PSTN between devices linked to said PSTN in said predetermined geographic region and devices linked to said external network outside of said PSTN.

2. An IP system in accordance with claim 1 wherein said first linking means includes:

means allowing said IP system to communicate with other IP systems in said PSTN.

3. An IP system in accordance with claim 1 wherein said second linking means comprises a gateway/firewall processor.

4. An IP system in accordance with claim 3 wherein said gateway/firewall processor is contained integrally within said first set of call processor units.

5. An IP system in accordance with claim 3 wherein said gateway/firewall processor is physically and logically separate from both said first and second sets of processor units.

6. An IP system in accordance with claim 2 wherein said external network comprises the Internet, and said second linking means comprises means presenting a client/server interface to said Internet.

7. An IP system in accordance with claim 1 wherein a service application processor unit in said second set is capable of controlling multiple voice-based services including presentations of voice announcements to PSTN users and instantaneous recognition of voice commands spoken by individual said PSTN users.

* * * * *